W. M. WHITE.
REGAINER FOR WATER POWER PLANTS.
APPLICATION FILED MAY 26, 1913. RENEWED JAN. 25, 1917.
1,223,841.
Patented Apr. 24, 1917.
3 SHEETS—SHEET 3.
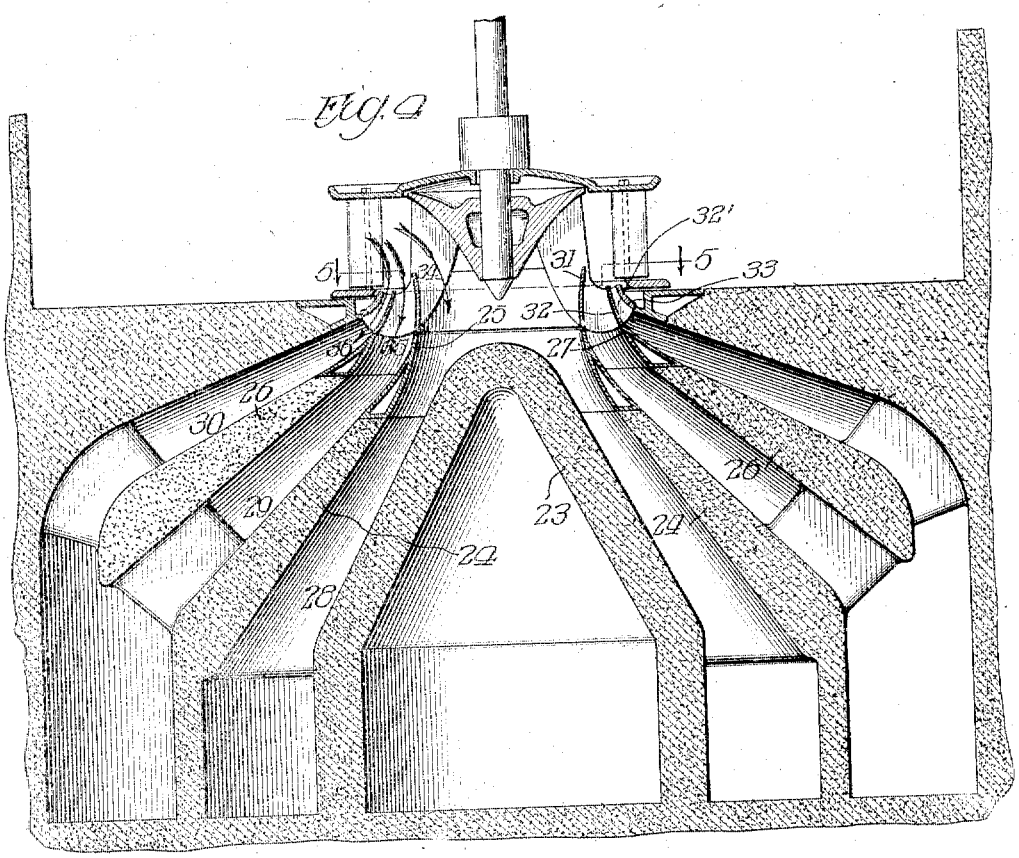
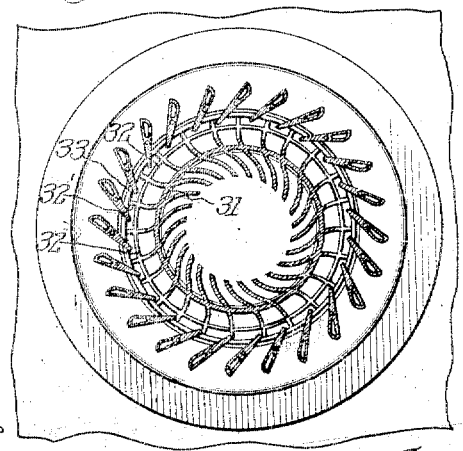

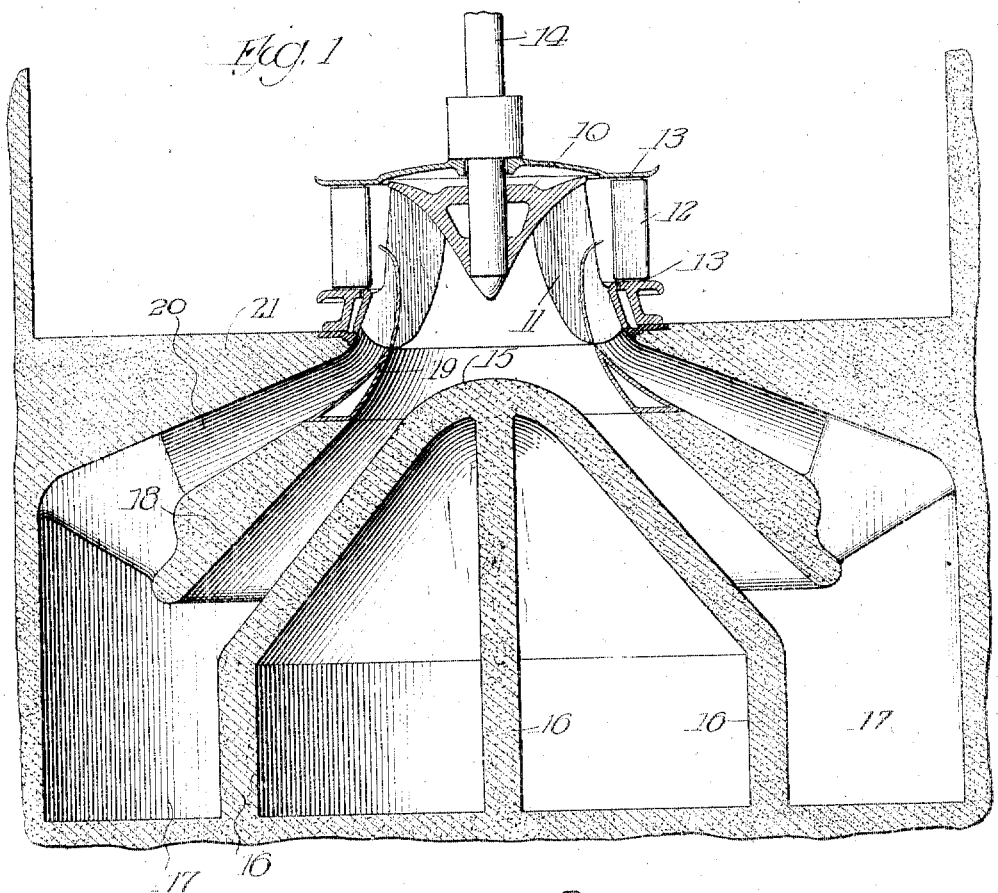
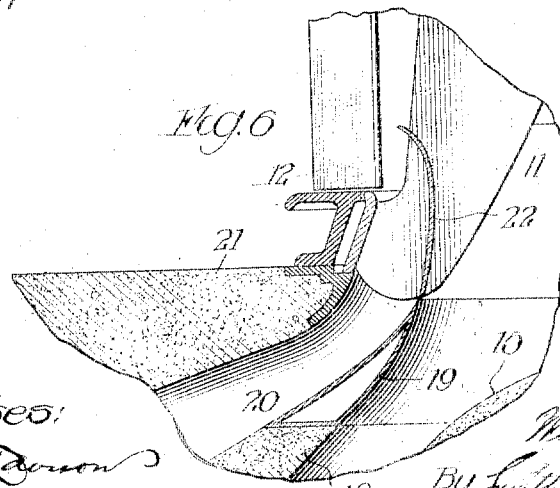

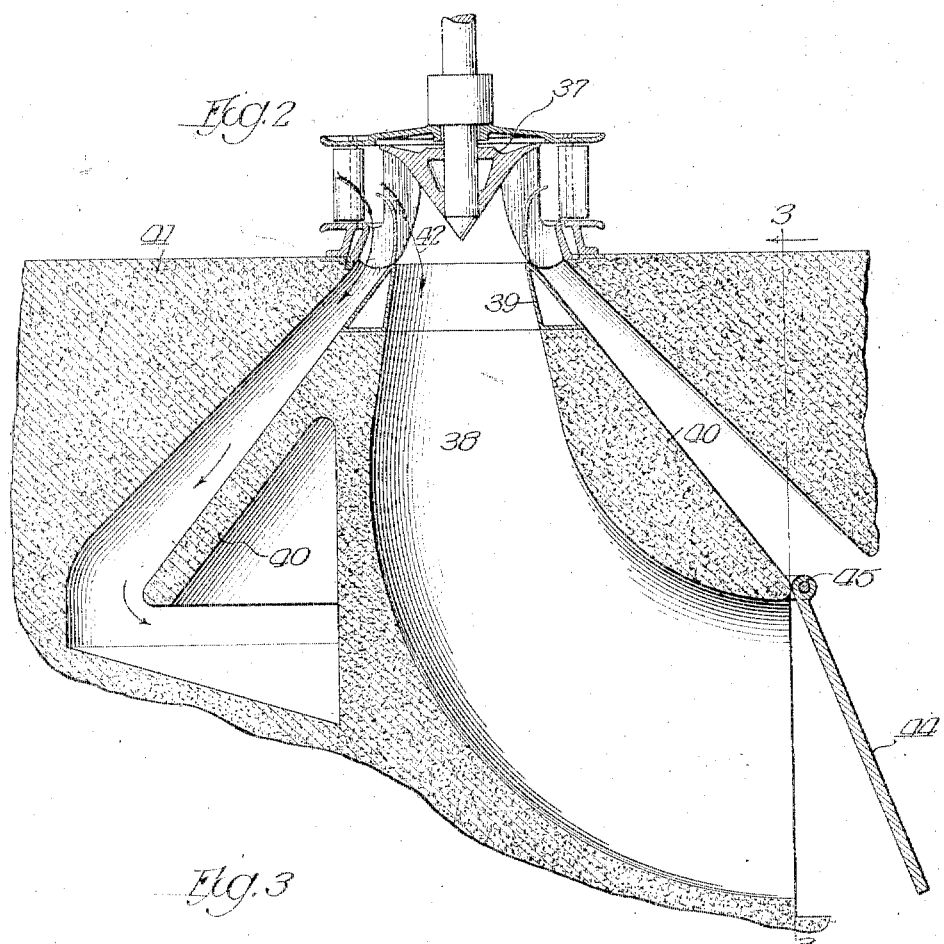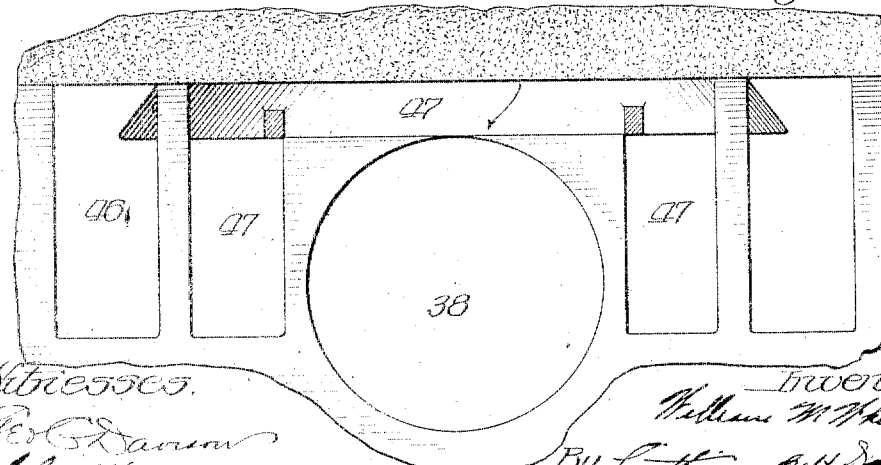

UNITED STATES PATENT OFFICE.

WILLIAM M. WHITE, OF MILWAUKEE, WISCONSIN.

REGAINER FOR WATER-POWER PLANTS.

1,223,841.  Specification of Letters Patent.  Patented Apr. 24, 1917.

Application filed May 26, 1913, Serial No. 769,790. Renewed January 25, 1917. Serial No. 144,547.

*To all whom it may concern:*

Be it known that I, WILLIAM M. WHITE, a citizen of the United States, and resident of Milwaukee, in the county of Milwaukee and State of Wisconsin, have invented certain new and useful Improvements in Regainers for Water-Power Plants, of which the following is a specification.

My invention relates to the water passages leading from hydraulic turbines and more particularly to the substitution of regainers for the draft tubes ordinarily used with water wheels.

This invention is of the type disclosed in my copending application, Serial No. 769,791, filed May 26, 1913.

The aforesaid application covers broadly the provision of walls defining a space of progressively increasing capacity from the water wheel runner outward, whereby the velocity head of the water may be transformed into pressure head with greatest efficiency. The present construction is a more specific form of that device. In my application, Serial No. 774,528, I have disclosed and claimed broadly a method of operating water wheels which might be carried out in constructions such as disclosed herein. The method contemplates certain steps wherein the effective head acting upon a water wheel may be increased, thereby increasing the efficiency of the water wheel with a slight decrease in plant efficiency, this being secured by passing an amount of water through the wheel in excess of that required for maximum efficiency and utilizing the increased discharge velocity of the water thereby produced to provide an effective head greater than the effective head of said maximum efficiency.

In usual practice the draft tubes from water wheels are in the form of circular conduits tapered from one diameter at the runner of the water wheel to a larger diameter at the end of the draft tube, the water being discharged in the direction of its flow to and down the tail race.

On account of the short distance between the horizontal center line of the water wheel and the top of the water in the tail race, there is not sufficient room to construct the present form of draft tubes in best shape for greatest efficiency.

This invention contemplates the substitution of regainers to take the place of the draft tubes. Such a regainer consists of a disk or cone so disposed in the flow of the stream from the runners as to deflect the water and discharge it along a passage of increasing area, the passage being arranged symmetrically about the center line of the runner. By this means the energy in the whirling water from the runner is utilized.

To one skilled in the art it is known that the power developed in a runner has an inconstant relation to the flow from the runner. This is particularly true when the turbine is operating at other than the load and speed for which it was designed. It is well known that the efficiency of a turbine decreases rather rapidly from one maximum point. This maximum efficiency point usually occurs at from three-fourths to seven-eighths full load. The loss in efficiency is due in a large part to the energy absorbed in discharging the water from the runner. The quantity of water used by a turbine is regulated by movable guides or gates, the runner consisting of vanes so disposed as to have curved discharge passages therethrough. The direction of these passages is opposite to that of the direction of the rotation of the runner. When the turbine is operating at a point somewhere between three-fourths and seven-eighths load, there then exists a relation between the openings between the guides and the passages between the runner vanes, so that the water discharged from the runner vanes has practically no whirl. For a larger opening between the guides the pressure between the runner vanes is greater whereby water is forced between the vanes of the runner at a higher velocity. The rotation of the runner remaining the same, there is a whirl in the discharge water or a motion opposite to the direction of rotation of the runner. Likewise when the guides are closed to provide an opening less than normal, the pressure between the runner vanes is low and as the velocity of the water through the runner vanes is consequently low, its backward speed is not equal to that of the forward motion of the runner which produces a whirl in the water in the direction of the rotation of the runner. Consequently the water from the runner for any condition except at the most efficient point, has a downward and whirling direction and has considerable absolute velocity with consequent considerable kinetic energy. This kinetic energy in the water as it leaves the runner when the turbine is operating at part loads may be considerably greater than it is when the turbine is operating at its most efficient load. The openings between the vanes of the runner are so disposed that part of the water is discharged near to the center of the runner and a part of it is near its outermost edge. Consequently under certain conditions, the whirl in the outer portion is much greater than that in the center and those particles in the outer edge of the runner contain considerably more kinetic energy than those near the center. In the ordinary form of draft tube these various streams are discharged together and those particles of water containing considerable kinetic energy come in contact suddenly and sharply with those particles containing a low amount of kinetic energy with the result that the kinetic energy is lost in friction, eddies and whirls. At low loads the water in the center of the tube flows up and apparently backward through the runner vanes near the periphery of the runner. The runner must set this water in motion from the center to the periphery with outlay of energy, which energy must be supplied in the form of new water from the head race without any production of useful power, so that the efficiency of the turbine unit is low.

This invention contemplates the installation of regainers in multiple whereby to take the water from the runner in different expanding passages. By discharging the water from the outer periphery of the runner through an independent passage I am enabled to avoid mixing stream flows of large kinetic energy with stream flows of small kinetic energy and regain that kinetic energy with maximum efficiency. By designing the various regainers used in the multiple so that each regainer returns the greatest amount of energy from the water flowing from that section of the runner I obtain, in the aggregate, higher efficiency from the runner at all loads than it is possible to obtain with the usual form of draft tube. The runner itself may be fitted with webs or partitions so that the flow lines within the runner itself may be kept separate and discharge into the separate division of the regainer, although such construction is not essential. By the use of multiple regainers substantially as described and regaining the separate energies as outlined above, I obtain a higher speed of the runner than has heretofore been obtained for equal conditions of power and head.

My invention also contemplates an additional outer section on the ordinary high speed runner, which in combination with the regainer, will operate at higher peripheral speed than has heretofore been obtained. This result may be secured in different ways and can be obtained by the use of the regainer in combination with the usual form of draft tube, the regainer being fitted around and about the outer section of the runner, the usual draft tube taking the discharge water from the center portion of the runner. In order to prevent the water flowing backward into the runner causing a loss in efficiency as heretofore described, I may add a valve on the lower end of the draft tube whereby the water is automatically prevented from flowing back. Such valve may be controlled by the operation of the same actuating mechanism that controls the guide vanes or may be operated merely by the flow of the water.

My invention will be more readily understood by reference to the accompanying drawings, wherein, Figure 1 is a transverse vertical section through a turbine and regainer as substituted for a draft tube;

Fig. 2 is a similar view of a somewhat modified construction in which the regainer surrounds the usual draft tube, the draft tube being equipped with a flap valve operating automatically by the flow of water;

Fig. 3 is a vertical section on the line 3—3 of Fig. 2;

Fig. 4 is a transverse vertical section of a construction somewhat similar to that of Fig. 1 except that an additional regainer is employed and the runner vanes are provided with an outer, high speed, extension;

Fig. 5 is a section on the line 5—5 of Fig. 4, and

Fig. 6 is an enlarged sectional view of a construction very similar to that shown in Fig. 1 except in that a web is provided between each of the runner vanes.

Referring more particularly to the drawings it will be seen that within the turbine pit I provide an opening over which the turbine 10 is mounted. This turbine is composed of runner vanes 11, the entrance of the water to the vanes being controlled by the guide vanes 12, pivoted or mounted for adjustment at the top and bottom in portions of the turbine casing 13. The turbine runner is secured to a vertical shaft 14, by means of which the power developed is utilized.

The opening in which the turbine is mounted communicates with a space therebeneath which space has passages for the water in its travel to the tail race. Mounted centrally in the spaces is a cone 15, supported on suitable piers 16, the water passing through the turbine vanes toward the center of the turbine flowing directly downward against the upper surface of the conical regainer 15, and is caused to expand laterally in straight lines down the sides of the cone into the space 17. Interposed above the upper surface of the cone 15, is an inclined wall 18, spaced away from the top surface of the cone a varying distance from top to bottom of the incline. While I have shown this spacing as varying, it will be understood that this is not essential as the space may be uniform. The upper portion of the wall 18, is, in the present construction, faced with a sheet steel collar 19, extending to a point closely adjacent to the lower edge of the runner vanes and at a point within the periphery of the lower edge thereof. It will be noted that any water which is forced or carried to the outer edge of the turbine vanes and sets up a whirling action upon its release from the vanes will be projected outside of the walls 18, 19, and into a space 20, extending between the wall 18, 19, and the wall 21, which wall forms the floor of the turbine pit. In this case also the space between the wall 18, 19, and the wall 21, is of varying height from the inner to the outer edge whereby a space of increasing area and increasing volume is provided. This likewise is not considered absolutely essential as the space between the walls may be of constant height. The water discharged into the space 20 expands freely in the increasing area and passes into the space 17, which space communicates directly with the tail race through a right angle bend if required.

Referring to the modification shown in Fig. 6, it will be seen that the same structure is employed beneath the turbine vanes, the only modification being in that a web 22, is provided between each of the runner vanes, this web extending nearly vertically downward its lower edge lying in a plane corresponding to the upper edge of the wall 19, whereby the water in the outer periphery of the vanes is selected and caused to invariably follow the path laid out for it; that is, into the space 20. Thus the possibility of the setting up of conflicting currents or the combination of particles of water of different absolute pressures is avoided.

A somewhat similar construction carried to a further point is shown in Figs. 4 and 5. In this construction I utilize the central cone 23, a correlated wall 24, 25, and an additional wall forming an additional cone regainer in the wall 26, 27. Thus I provide passages 28, 29, 30, all of constantly increasing area whereby water passing through the turbine inwardly, downwardly and outwardly, is taken off and the velocities therein contained are regained into pressure without resultant eddies or conflicting currents. In this construction, as in the construction of Fig. 6, I have provided connecting webs 31, 32, between the runner vanes and have provided in addition an outward extension 32' on each of the runner vanes, this extension being in addition to the normal practice in the construction of runner vanes.

In addition I have provided a web 33, joining the outer edges of the extensions 32'. In this construction I have assumed three velocities of water, three directions of force and three separate regaining effects to be secured, that is, one direction of force in the line of the arrow 34, one direction in the line of the arrow 35, and one direction in the line of the arrow 36. Assuming that the lines of force are as indicated by the arrows, it will readily be seen that the combination of these different forces and different velocities in one mass of water will set up a whirl having a high absolute velocity. Therefore the object in this construction is to segregate these velocities and directions of velocity, delivering them each separately without the loss of energy entailed by the combination of the three.

The construction shown in Fig. 4 I consider to be particularly adaptable to turbines operating under low head where a high speed is required.

In the construction of Figs. 2 and 3, I have applied the ideas heretofore expressed to a construction somewhat similar to that at present employed; that is, I mount the turbine 37 above a draft tube 38 of approved contour. I have, however, provided a cone regainer 39 outside of the draft tube, this regainer being formed from the wall 40, also going to make up the draft tube and by the wall 41, forming a portion of the pit floor. In this instance water passing through the runner vanes in the direction of the arrow 42, will pass into the draft tube 38. However, the water which would otherwise follow the line of the arrow 43, will be taken care of in the space 39, and will be allowed to expand freely in the increasing area whereby the velocity is transferred into pressure. Furthermore, under part loads, where a whirling action is set up, the body of water at the outer edge of the vanes may assume a bodily spiral whirl over the cone 39, without conflict with the portion of the water received in the tube 38. As heretofore explained, it is not uncommon under part loads for the water in the center of the tube to be forced upwardly because of the whirling action of the exterior portion thereof. To obviate the possibility of any such current in the present construction I provide the flap valve 44, which may be as shown, a simple valve pivoted at 45, adapted to swing outwardly under normal flow but which will seat and prevent any backward flow which might be induced within the draft tube 38.

In Fig. 3 the construction is shown as facing the opening controlled by the valve 44. It will be seen that the water passing down over the cone 39 will, after its pressure has been regained, pass out through the openings 46, 47.

It will be noted that in this application I have laid stress upon the employment of means of selectively distributing portions of the water at different elevations or locations of the runner vanes utilizing the kinetic energy in such portions of the water, transforming this energy into potential energy without combining these portions in such manner as to cause a loss of energy through conflicting and opposing currents. This is especially desirable when running at part loads as heretofore described. It will, however, be found to be of advantage when running at rated loads.

It will be understood that the construction herein described, although particularly directed to utilization of the kinetic force in the whirl of the water is not less effective in the utilization of the kinetic energy when the water flows from the runner without whirl.

It will be understood that the construction herein shown is capable of other modifications and such modifications as are within the scope of my claims I consider within the spirit of my invention.

By water wheel under the present specification and claims, I mean a water wheel, hydraulic turbine or any hydraulic power producing apparatus having a runner of such form as to cause the water to be discharged from it preferably axially to the rotation of the runner, and I mean especially any hydraulic power apparatus which may be used with my invention for the accomplishment of the results claimed. One type of a water wheel in the meaning of the specification and claims is illustrated in the drawings.

I claim:

1. In a device of the class described, the combination of a water-wheel mounted in a water passage, the space beneath said passage being divided into a plurality of unobstructed conduits within which the water may whirl, the conduits receiving water from the water-wheel at different velocities and causing said water to be expanded into a progressively increasing space, whereby pressure is regained from velocity, substantially as described.

2. In a device of the class described, the combination of a water-wheel mounted in a water passage, a flared tube registering with said passage, said tube being adapted to receive water passing through a portion of said water wheel, and an annular radial passage arranged around said tube, the walls of said passage being formed to deflect the water from axial to substantially radial in a relatively sharp bend near the runner, said last named passage being adapted to receive and permit the radial expansion of water discharged through a portion of said water wheel runner, substantially as described.

3. In a device of the class described, the combination of a water wheel and a plurality of annular concentric passages communicating with the discharge of the wheel and receiving water from different portions thereof, each passage being unobstructed to permit the whirling of the water therein and having a component radial to the axis of the rotation of the wheel.

4. In a device of the class described, the combination of a water-wheel mounted in a water-passage, the space beneath said water-wheel being divided into a plurality of separated passages, one of said passages being disposed to cause substantially radial flow of water, each of said separated passages being centrally arranged with reference to said water-wheel whereby water discharged from one portion of said water-wheel is permitted substantially radial expansion in all directions from said water-wheel, substantially as described.

5. In a device of the class described, the combination of a water-wheel mounted in a water passage, said wheel having runner vanes, webs between adjacent vanes, the space at the discharge end of said water-wheel being divided into a plurality of separated passages, the openings into said passages registering with those divisions of the water-wheel which are formed by said webs, the outer of said passages having an extreme flare whereby water received into said passages from the water wheel is permitted substantially radial flow in all directions, substantially as described.

6. In combination, a water wheel, a draft tube receiving water from the central portion of said water wheel, and walls providing a passage about the outer peripheral section of the water wheel and extending substantially radially therefrom whereby water received in said passage in a whirling state may by centrifugal force produce an increased suction on said outer peripheral portion of the water wheel, substantially as described.

7. In combination, a water wheel including a runner, said runner being divided into concentric annular sections, walls adjacent to the discharge from said runner, said walls forming a multiplicity of concentric cone-like passages, said passages registering with the divisions in said runner, said passages being unobstructed and one thereof having an extreme flare and wherein the centrifugal force of bodily rotating water may be effectively employed to increase the suction action on said runner, substantially as described.

8. In combination, a water wheel including a runner, said runner being divided into concentric annular sections, walls adjacent to the discharge from said runner, said walls forming a multiplicity of concentric cone-like passages, said passages registering with the divisions in said runner, said passages being unobstructed and one thereof having an extreme flare and wherein the centrifugal force of bodily rotating water may be effectively employed to increase the suction action on said runner, substantially as described.

9. In a device of the class described, the combination of a water wheel, a plurality of discharge passages for the water from said water wheel, and a one-way valve controlling the flow of water from one of said passages, substantially as described.

10. In a device of the class described, the combination of a water wheel, a plurality of discharge passages therefor, and a flap valve controlling the flow of water from one of said passages, said valve being mounted to permit egress of water from and prevent ingress of water to the passage controlled thereby, substantially as described.

11. In a device of the class described, the combination of a water wheel, a draft tube axially located with reference to said wheel, an annular passage around said draft tube, said last named passage being adapted to receive a portion of the water discharged from said water wheel, and a valve located at the discharge from said draft tube and preventing the return flow of water into said tube, substantially as described.

WILLIAM M. WHITE.

Witnesses:
CHAS. F. MURRAY,
T. D. BUTLER.